A. B. SHAW.
AUTOMATIC GAS LIGHTING AND EXTINGUISHING MECHANISM.
APPLICATION FILED APR. 8, 1911.

1,072,998.

Patented Sept. 9, 1913.
2 SHEETS—SHEET 1.

WITNESSES
A. T. Palmer
Mary Connors

INVENTOR
Al B. Shaw
BY Smith & Frisbee
ATT'YS.

A. B. SHAW.
AUTOMATIC GAS LIGHTING AND EXTINGUISHING MECHANISM.
APPLICATION FILED APR. 8, 1911.
1,072,998.
Patented Sept. 9, 1913.
2 SHEETS—SHEET 2.
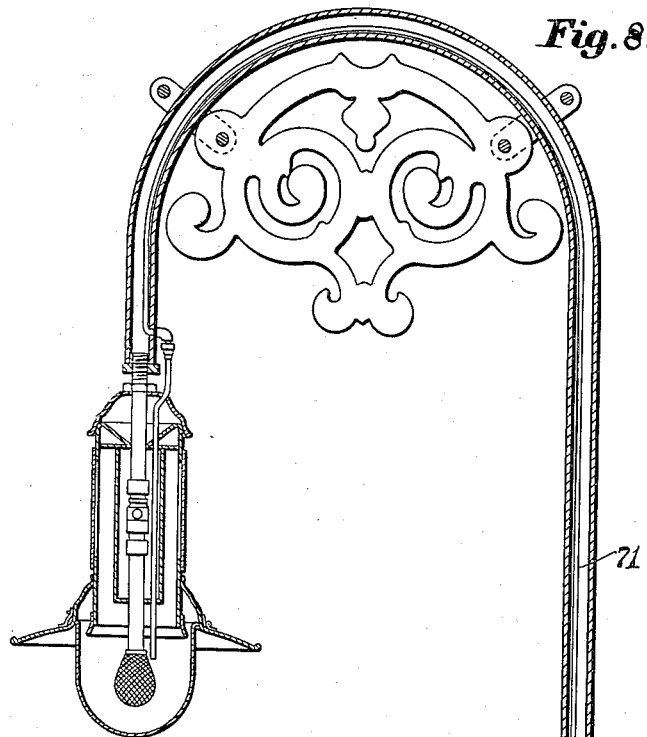
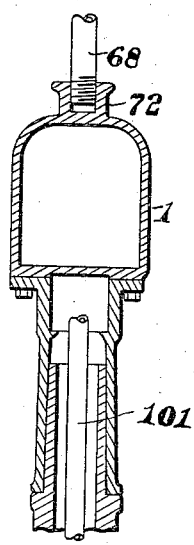
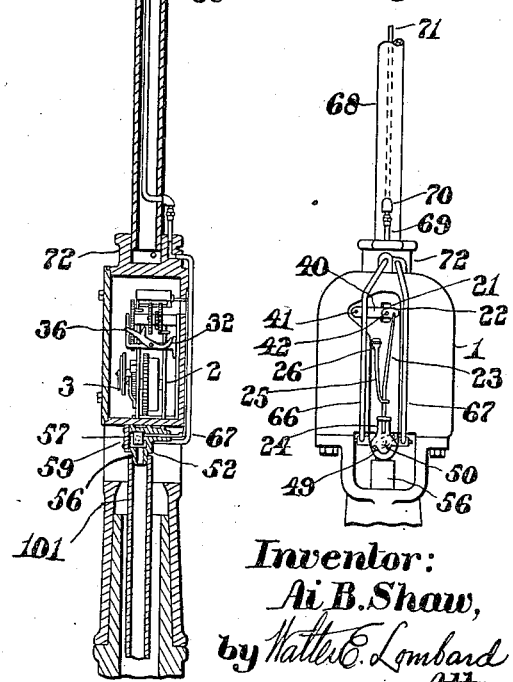
Witnesses:
N. C. Lombard
Mary C. Smith.
Inventor:
A. B. Shaw,
by Walter E. Lombard
Atty.

UNITED STATES PATENT OFFICE.

AI B. SHAW, OF WEST MEDFORD, MASSACHUSETTS, ASSIGNOR TO AUTOMATIC GAS LIGHTING EQUIPMENT CO., OF BOSTON, MASSACHUSETTS, A CORPORATION OF MASSACHUSETTS.

AUTOMATIC GAS LIGHTING AND EXTINGUISHING MECHANISM.

1,072,998.  Specification of Letters Patent.  Patented Sept. 9, 1913.

Application filed April 8, 1911. Serial No. 619,861.

*To all whom it may concern:*

Be it known that I, AI B. SHAW, a citizen of the United States, residing at West Medford, in the county of Middlesex and State of Massachusetts, have invented certain new and useful Improvements in Automatic Gas Lighting and Extinguishing Mechanism, of which the following is a specification, reference being had therein to the accompanying drawing.

My invention relates to improvements in automatic gas lighting and extinguishing devices, designed especially to be used in connection with burners having incandescent mantles for use in lighting streets, and in which the gas supply to the gas burner or burners is controlled by a suitable time mechanism placed within a standard which forms a casing for the time mechanism, and which standard is placed preferably between two sections of the lamp-post, or in the case of an overhanging lantern, upon the top of the lamp-post between it and the gas pipe supporting the lantern, and the burners will be lighted and extinguished at predetermined times by the operation of such time mechanism.

This invention consists in the improved and novel way of controlling the flow of gas to the main burner and to the pilot burner and to the pilot burner of street-lamps over what is shown in my United States Letters Patent No. 868,297, dated October 15, 1907 and has for its principal object to adapt the device to the existing forms of lanterns used on street-lamps without having to materially change the lamp-post and lantern and to otherwise improve the device, as will clearly hereinafter be described and claimed.

The invention consists in the novel constructions, arrangements and combinations of parts, substantially as described and particularly set forth in the claims annexed hereto, and it is carried out substantially as illustrated on the accompanying drawings, which form an essential part of this specification, and whereon like characters of reference refer to like parts wherever they occur thereon.

Figure 1:
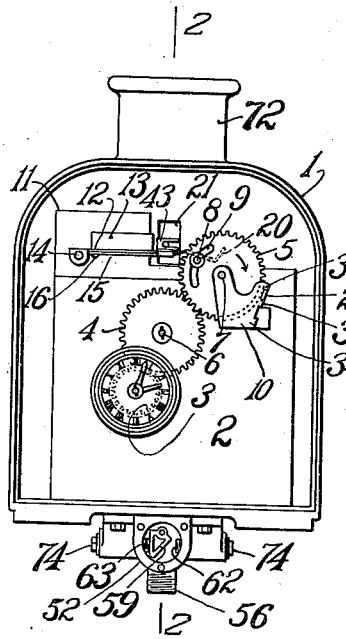
Figure 2:
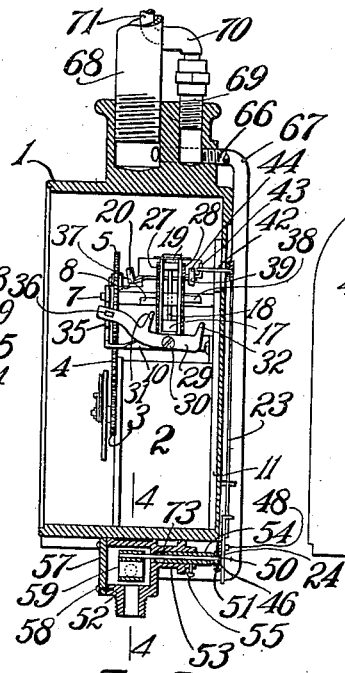
Figure 3:
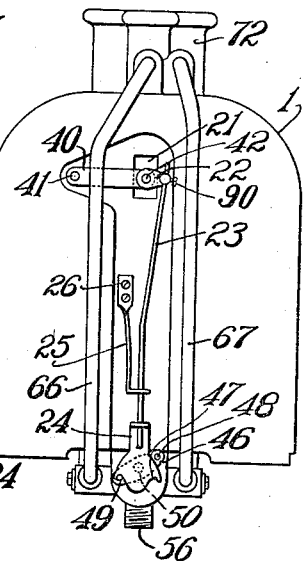
Figure 4:
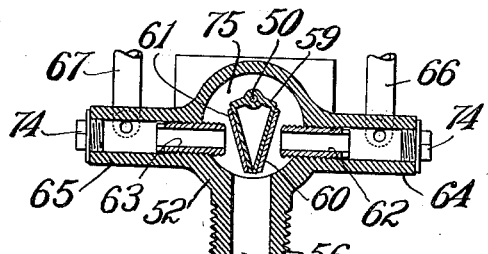
Figure 5:
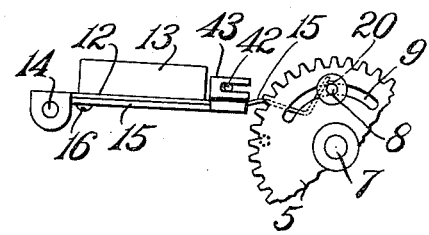
Figure 6:
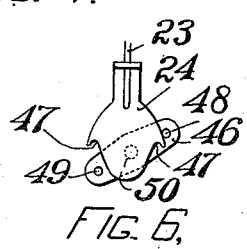
Figure 7:
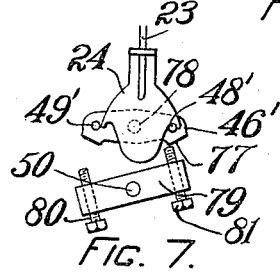

In the drawings, Figure 1 represents a front elevation of my improved device with the front cover of the casing 1 and the cap 57 removed. Fig. 2 represents a sectional elevation of my apparatus on the line 2—2 of Fig. 1 but with the mechanism within the case shown in side elevation. Fig. 3 represents a rear elevation of the invention. Fig. 4 is a transverse sectional view on the line 4—4 of Fig. 2. Fig. 5 is a detail of a portion of the mechanism shown in Fig. 1. Fig. 6 is a detail of a portion of the valve actuating mechanism. Fig. 7 is a modified construction of the same. Fig. 8 is a sectional side elevation of a lamp post embodying the features of the present invention. Fig. 9 is a rear elevation of a portion of the same, and Fig. 10 is a central sectional view of a portion of the same.

Within the casing 1, is placed the time or clock mechanism 2, from the moving parts of which motion is derived to operate the gas controlling valves and other moving parts of the device. The hour wheel 3 of the time mechanism meshes into a train of spur gears, which has been shown on the drawings as consisting of the gears 4 and 5, the latter loosely mounted upon the shaft 7.

Upon the gear 5 is mounted a projecting stud 8 which projects in a line substantially parallel to the shaft 7 and said stud is adjustable upon said gear within a segmental slot 9 which is concentric with the shaft 7; this stud 8 therefore forms substantially a crank pin on the gear 5. The forward end of shaft 7 is rotatably mounted in a bearing in the bracket 10, attached to the casing 1, or to a plate 11 secured within the casing, which plate also acts as a support for the time mechanism, see Figs. 1 and 2.

A lever 12, provided with a weight 13, is pivotally attached at 14 to the plate 11 in such a manner that its free end is free to be raised or lowered at will. The lever 12 is preferably made in the form of a flat plate as shown, and a lever 15 is pivotally attached to said lever at 16, in such a manner that its free end can be moved toward or from the back of the gear 5 into and out of the path of the rotations of the stud or crank pin 8 on said gear, around the shaft 7. As the gear 5 is twice as large in diameter as that of the hour wheel 3, and as the hour wheel is rotated twice in every twenty-four hours or a day, it will be seen that the gear 5 will be rotated once every twenty-four hours, and when the lever 15 is turned into the path of the rotations of the stud 8 on the gear 5, it will be seen that the free end of said lever will be raised and allowed to drop by the influence of its weight, once every twenty-four hours.

Upon the shaft 7 is firmly mounted a frame 17, within which is rotatably mounted a shaft 18, having its axis of rotation at right angles of axis of rotation of the shaft 7 and located within a plane passing through the axis of rotation of the latter shaft. The shaft 18 has a star wheel 19 firmly mounted on one end of the said shaft and a worm (not shown) firmly mounted upon the opposite end thereof. This worm meshes into two worm wheels located diametrically opposite each other in relation to said worm, and these worm wheels are firmly mounted upon their respective short shafts, which are rotatably mounted within suitable bearings in the frame 17. Upon these short shafts are firmly mounted two small spur gears or pinions, which mesh into two spur gears 27, 28 loosely mounted upon the shaft 7 at opposite ends of the frame 17 and its shaft 18. As the worm wheels are located on opposite sides of the worm, it will be seen that any rotation of the worm will tend to cause a rotation of the worm wheels in opposite directions to each other, and as the pinions on the shafts which carry the worm wheels each mesh into a spur gear mounted on the shaft 7, it will be seen that the rotation of the worm will cause a rotation of these spur gears on the shaft 7 in opposite directions relative to each other. As these parts are clearly shown and described in my said patent, I have not deemed it necessary to illustrate all of the minor parts in these drawings.

In order to cause a partial or slight rotation of the shaft 18 at each complete rotation of the shaft 7 which carries the shaft 18 and its frame 17, a lever 29 is fulcrumed at 30 to the bracket 10, which lever is provided with the projections 31 and 32, one or the other of which is brought into the path of the teeth of the star wheel 19 on diametrically opposite sides of said star wheel during each complete rotation of the shaft 7, and by the rocking of the lever 29 upon its fulcrum. The rocking movements of the lever 29 are limited in both directions by stop-projections 33 and 34 on the bracket 10 so as to properly position the projections on the lever in relation to the teeth of the star wheel. The bracket 10 is also provided with a projection 35, which in connection with a perforation 36, in the lever 29, acts to hold the lever at a position midway between the stop projections on the bracket and so that the projections on the lever 29 will be out of the path of the teeth of the star wheel during the rotation of the star wheel around the shaft 7. As one or the other of the projections on the lever 29 engage the teeth of the star wheel, on diametrically opposite sides of the star wheel, once in each revolution of the shaft 7, according to the position of the lever 29, and as this engagement of the teeth of the star wheel will cause a slight rotation of the star wheel by each rotation of the shaft 7, but in opposite directions, according to which one of the projections on the lever is brought into the path of said star wheel, it will be seen that the desired directions of the consequent rotation of the shaft 18 may be obtained by the adjustment of the lever 29. As the direction of the rotation of the shaft 18 and its worm controls the direction of the rotation of the spur gears 27 and 28 on the shaft 7, it will be seen that the direction of the rotation of said spur gears may be governed by the adjustment of the lever 29.

The spur gears 27 and 28 are provided with the respective projecting studs 37 and 38 which are preferably immovably attached to said gears as shown, but which may be adjustably mounted thereon in a manner similar to the projecting stud 8 on the gear 5. The lever 15 on the weighted lever 12 may be turned upon its fulcrum so that its end will be in the path of the upward part of the rotation of the stud 37 with its gear 27, and will therefore cause an upward and downward movement of the free end of the weighted lever 12 at each rotation of the gear 27.

Most of the parts which have just been described are the same parts as shown and described in my said Letters Patent, and for this reason I have used wherever possible the same terms and like numerals for the same parts.

The mechanisms between the operating weighted lever 12 and the burners of the lamp, which mechanisms are controlled and operated by the movements of the weighted lever, are substantially as follows: A lever 40 is fulcrumed, in a recess in the back of the casing, at 41 to the rear side of the plate 11 and is provided at its free end with a stud or pin 42 which projects on opposite sides of the lever. The forward portion of the pin 42 passes through an opening 21 in the plate 11 and enters a slotted perforation in a projecting ear 43 on the weighted lever 12, and the rear portion of the pin carries an arm 22 to the opposite end of which arm is adjustably secured, by the set screw 90, the upper end of a rod 23. This rod carries at its lower end a cam member 24 having an inverted U-shaped surface on its lower side and provided with the two recesses 47, one on each side of said cam member and adapted to alternately receive the pins 48, 49 extending from opposite ends of the tilt bar 46, which bar is mounted upon a shaft 50. Figs. 1 and 3 show the parts in a position with the valve closing the gas supply to the main burners but allowing gas to pass into the supplemental pipe 66 and thence to the pilot burner. This would also be the case when the parts are in the position as shown in Fig. 6. In Figs. 2 and 4 I have shown the valve as midway so that gas is passing into both the supplemental pipes and thence to both pilot and main burners and both would be lighted. They would also be lighted when the parts are as shown in Fig. 7. A hooked spring 25 fastened at 26 to the rear side of the plate 11 tends to keep some portion of the cam member 24 pressed against one of the pins 48, 49 until one of the pins passes into one of the recesses 47 so that the tilt bar 46 is moved or turned according to the upward and downward movement of the rod 23 and plate 12.

The shaft has its bearings in the bracket coupling 52 and in the tubing or collar 54 locked within the bracket arm 53 by the set screw 55 which tends to keep the collar 54 locked within the bracket arm 53 by the set screw 55 which tends to keep the collar 54 pressed against the packing 73 in such a manner that the packing is pressed firmly enough around the periphery of this shaft to cause the right amount of friction on the shaft 50 so that the tilt bar 46 can be moved when the opposite pin 48, 49 from that pin which was last moved has been caught in its respective recess 47 and just the right amount of pressure has been applied thereon by the downward movement of the rod 23, and this packing also serves to prevent leakage of gas from the chamber 75 around the shaft 50.

The inner end of the shaft 50 carries the V-shaped valve 59 within the chamber 75 in the bracket coupling 52 and access to this valve is obtained by removing the cap or plate 57 attached by screws 58 to the front of the bracket coupling; this bracket coupling also having the threaded stem piece 56 to be inserted into the top of the lamp post 101 whereby the casing 1 which is bolted to the bracket coupling 52 is secured to said lamp-post or other device on which the lamp is used. The chamber 75 is in open communication with the inlet 76 in the threaded stem piece 56 through which gas or other suitable illuminating material is supplied. This bracket coupling is similar to a T-shaped coupling being provided with outwardly extending arms 64, 65 on each side of the valve 59, one arm 65 having the supplemental pipe 67 connected thereto which pipe extends upward and through the upper portion of the casing 1 into a duct or passage, and into which passage is inserted the lower end of the main gas pipe 68, the other end of the main gas pipe connecting with the main burner; the supplemental gas pipe 67 preferably extending into the passage below the lower edge of the main gas pipe 68. The other arm 64 having the supplemental pipe 66 connected thereto which pipe extends upward and into the upper portion of the casing 1 and into the short piping 69 which short piping extends upward and is connected by the union L 70 to the pilot gas pipe 71 located within the main gas pipe 68 which pipe 71 carries gas to the pilot burner, and the gas for the main burner being carried by the main gas pipe 68.

Within the passageway in the arms 64, 65 are respectively the threaded inner tubes 62 and 63 which are screwed therein and into the chamber 75 within the bracket coupling until they are in the proper position to be met by the sides of the V-shaped valve 59 which sides respectively carry outer faces 60, 61 of fibrous or other material to form an air tight closure to the ends of the pipe 62 and 63. These tubes 62, 63 are inserted through the openings into the passageways in the arms 64, 65 which openings in the arms are closed by plugs 74.

In order that the toothed member 46 and its valve 59 will not be operated too quickly, the outer end of the lever 15 has an inclined surface 20 so that it will gradually allow the lever to drop as this inclined surface 20 slides down and off the projecting stud 8 and down and off the projecting stud 37 of the spur gear 27. And the rigidly attached projection 39 is provided with a similar inclined surface 44 so that this inclined surface will pass slowly and gradually off of the stud 38 on the spur gear 28.

It will be understood that an up and down movement of the weighted lever 12 will cause corresponding up and down movements of the end of the lever 40 with the pin 42, the link 22 and the rod 23 carried thereby. This up and down movement will cause the recesses 47 of the cam member 24 on the end of the rod 23 to alternately engage the pins 48, 49 and alternately throw down opposite sides of the tilt bar 46 and turn the valve 59 from the mouth of one of the threaded inner tubes to the mouth of the opposite tube 62, 63.

Assuming that the parts are in the positions shown in Figs. 1 and 2 and that the lever 15 is resting on the stud or crank pin 8, then as the mechanism continues to move, the lever 15 will be gradually raised and the rod 23 with its cam member 24 will be simultaneously raised with one of its upper cam sides pressing against the pin 48, but as soon as the pin 48 has passed over the tooth of the cam, on that side, the spring 25 presses the rod 23 and its cam member 24 so that the pin 48 is caught within the recess 47 on that side of the cam and as the inclined surface 20 of the lever 15 passes down and off the stud 8, the rod 23 is carried downward so that the side of the tilt bars 46 having the pin 49 is tilted up. The valve is thus moved from its position closing the supply of gas to the main burner to a position shutting off the supply of gas to the pilot burner. By this arrangement of mechanism it will be seen that the passageways within the tubes 62, 63 are alternately closed but that the supply of gas will continue to flow through the pilot gas pipe 71 to the pilot burner and continue to be burned for a short time after the face 60 of the valve 59 has been turned toward the mouth of the tube 62 to close it and therefore for a short space of time, the length of time being controlled by the mechanism herein shown, the pilot burner and main burner are both burning but when the opening to the tube 62 is closed, the gas is shut off from the pilot burner but the burners would burn for a short space of time when the pilot burner would go out leaving the main burner burning, the gas being supplied to the same from the lamp post through the inlet 76, chamber 75, tube 67 and main gas pipe 68. When the valve 59 is turned in the opposite direction the gas enters the tube 62 from the chamber 75 and flows upward through the supplemental pipe 66, short pipe 69, union L 70 and pilot gas pipe 71 to the pilot burner where it is lighted from the flame from the main burner, the valve 59 continues to turn, the amount of gas entering the tube 63 gradually lessening and the flame of the main burner decreasing until the face 61 comes tight against the mouth of the tube 63 when the gas is entirely shut off from the main burner and the light goes out. It is thus seen that the lighting of the gas supplied to the pilot burner is insured before the pilot burner is extinguished and that the lighting of the gas supplied to the main burner is insured before the pilot burner is extinguished.

In the modified construction of a portion of my device shown in Fig. 7 instead of having the tilt bar 46 mounted upon the shaft 50 I mount a tilt bar 46' upon a stud 78. This bar is provided with the pins 48', 49' similar to the pins 48, 49 but the bar is preferably provided with the inclined surfaces or noses 77 which operate against the upper ends of the adjustable bolts or screws 80, 81 extending through the tilt plate or lever 79 carried on the outer end of the shaft 50. Therefore when one side of the tilt bar 46' is pressed down the nose 77 of that side hits upon the top of the threaded bolt on that side of the plate turning said plate and said shaft 50 and operating the valve 59.

It is to be understood that my invention is not limited to the specific details of construction shown in the accompanying drawings, but that said details may be varied in the practical carrying out of my invention.

It is also to be understood that the combinations specifically set forth in the several claims are intended to be separately claimed without limitation to the use in connection therewith of other features and details of construction illustrated.

I claim as my invention:—

1. In an automatic gas lighting and extinguishing device, a time mechanism, a rotary shaft operated by the time mechanism, disks carried by and rotated with said shaft, crank pins carried by said disks, a weighted lever having a rigidly attached projection provided with an upwardly inclined surface at its outer end, a movable lever pivoted on said weighted lever and provided with an upwardly inclined surface at its outer end, said inclined surfaces engaged by said crank pins during their rotations to intermittingly raise said weighted lever and allow it to drop, and gas controlling means operated by the movements of said lever.

2. In an automatic gas lighting and extinguishing device, a time mechanism, a weighted lever, intermediate mechanism between the time mechanism and weighted lever whereby the lever is raised and allowed to fall at predetermined times, a rotary shaft, a rod operated by said shaft, a source of gas supply below said time mechanism, main and pilot gas pipes, a V-shaped valve beneath said time mechanism controlling the supply of gas and means between said valve and rod whereby the upward and downward movement of the rod operates said valve.

3. In an automatic gas lighting and extinguishing device, a main and a pilot gas pipe, a time mechanism, a rod, intermediate mechanism between the time mechanism and rod whereby the rod is raised and allowed to fall at predetermined times, a V-shaped valve beneath the time mechanism operated by the movements of the rod whereby the gas is allowed to flow into the main and the pilot gas pipes in a manner to allow the main burner to be lighted by the pilot burner before the supply of gas to the pilot burner is shut entirely off and vice versa.

4. A gas-supply pipe, a standard attached to the top of the pipe, main and pilot gas piping extending upward from the top of the standard, a pair of supplemental pipes without the standard connecting the gas-supply pipe and the piping, a V-shaped valve at the mouth of the gas-supply pipe controlling the passage of gas to the supplemental pipes, time mechanism within the standard, and means connecting this mechanism with the valve whereby the times of engagement and disengagement of the V-shaped valve with each supplemental pipe is automatically varied by the mechanism within the standard to compensate for changes in the lengths of the days and nights.

5. In an automatic gas lighting and extinguishing device, a casing, a time mechanism, a weighted lever, intermediate mechanism between the time mechanism and weighted lever whereby the lever is raised and allowed to fall at predetermined times, a rotary shaft extending without the casing, a rod without the casing, a bracket coupling attached to the underside of the casing and provided with a downwardly extending stem adapted to couple to a gas riser, a shaft carried by the bracket coupling, a valve within the bracket coupling on the inner end of said shaft, a supplemental pipe extending from one end of the bracket coupling to carry gas to the main gas pipe, a supplemental pipe extending from the opposite end of the bracket coupling for carrying gas to the pilot gas pipe and a member operated by said rod to turn said shaft and shut off the gas from one of the supplemental pipes and allow the gas to pass to the other supplemental pipes.

6. In an automatic gas lighting and extinguishing device, a plurality of gas burner supply pipes, a time mechanism, a weighted lever, a rod carried by said lever, a tilt bar operated by the downward movement of the rod, a valve beneath the time mechanism actuated by the movement of the tilt bar for controlling the supply of gas to the gas burner supply pipes, and intermediate mechanism between the time mechanism and weighted lever operated by the time mechanism to automatically and intermittingly raise said weighted lever and rod and allow them to drop.

7. In an automatic gas lighting and extinguishing device, a main gas supply pipe, a T-shaped coupling attached thereto, a supplemental gas pipe extending from one end of the coupling for supplying gas to a main burner, a supplemental pipe extending from the other end of the coupling for supplying gas to a pilot burner located adjacent the main burner, a shaft, a V-shaped valve mounted on the shaft within the coupling controlling the supply of gas to the supplemental pipes alternately shutting off the supply of gas from the supplemental pipes whereby gas will be shut off at one or the other of the burners after the other burner has become lighted while the device is in operation, time mechanism above the valve, a tilt bar on the opposite end of the shaft, and means connecting said tilt bar and time mechanism.

8. In an automatic gas lighting and extinguishing device, a main gas supply pipe, a T-shaped coupling attached thereto, a supplemental gas pipe extending from one end of the coupling for supplying gas to a main burner, a supplemental pipe extending from the other end of the coupling for supplying gas to a pilot burner located adjacent the main burner, a shaft, a double faced V-shaped valve mounted on the shaft within the coupling controlling the supply of gas to the supplemental pipes alternately shutting off the supply of gas from the supplemental pipes whereby gas will be shut off at one or the other of the burners after the other burner has become lighted while the device is in operation, a time mechanism above the valve, a pivoted member adapted to turn the shaft and its valve as it is swung on its fulcrum, and intermediate mechanism between the time mechanism and the pivoted member intermittingly operated by the time mechanism to alternately turn said pivoted member.

In testimony whereof I affix my signature in presence of two witnesses.

AI B. SHAW.

Witnesses:
 JAMES H. STARK,
 JOHN C. GORDON.